United States Patent
Wahrlich

(10) Patent No.: US 9,366,779 B2
(45) Date of Patent: Jun. 14, 2016

(54) SIGNAL PROCESSING TECHNIQUE FOR A METAL DETECTOR

(71) Applicant: Minelab Electronics Pty Limited, Torrensville (AU)

(72) Inventor: Philip Shane Wahrlich, Torrensville (AU)

(73) Assignee: Minelab Electronics Pty Limited, Torrensville, South Australia (AU)

( * ) Notice: Subject to any disclaimer, the term of this patent is extended or adjusted under 35 U.S.C. 154(b) by 0 days.

(21) Appl. No.: 14/429,084

(22) PCT Filed: Apr. 24, 2014

(86) PCT No.: PCT/AU2014/000466
§ 371 (c)(1),
(2) Date: Mar. 18, 2015

(87) PCT Pub. No.: WO2014/172751
PCT Pub. Date: Oct. 30, 2014

(65) Prior Publication Data
US 2015/0219781 A1     Aug. 6, 2015

(30) Foreign Application Priority Data

Apr. 26, 2013 (AU) ................ 2013901459

(51) Int. Cl.
| | |
|---|---|
| *G01V 3/10* | (2006.01) |
| *G01V 3/38* | (2006.01) |
| *G01V 3/02* | (2006.01) |
| *G01V 99/00* | (2009.01) |

(52) U.S. Cl.
CPC .. *G01V 3/10* (2013.01); *G01V 3/02* (2013.01); *G01V 3/38* (2013.01); *G01V 99/00* (2013.01)

(58) Field of Classification Search
CPC ........... G01V 3/10; G01V 3/08; G01V 3/081; G01V 3/38; G01V 3/00
See application file for complete search history.

(56) References Cited

U.S. PATENT DOCUMENTS

| | | |
|---|---|---|
| 6,559,645 B2 | 5/2003 | Arndt et al. |
| 7,432,715 B2 | 10/2008 | Stamatescu |
| 2002/0027438 A1 | 3/2002 | Ott et al. |

(Continued)

FOREIGN PATENT DOCUMENTS

| | | |
|---|---|---|
| AU | 2007304831 A1 | 4/2008 |
| AU | 2009243482 A1 | 7/2010 |
| AU | 2011101689 A4 | 2/2012 |

(Continued)

OTHER PUBLICATIONS

Abeynayake et al., A Kalman Filter-Based Approach to Detect Landmines from Metal Detector Data, 2001 IEEE, pp. 2492-2494.*

*Primary Examiner* — Toan Le
(74) *Attorney, Agent, or Firm* — The Webb Law Firm

(57) ABSTRACT

A method for detecting a target in a soil using a metal detector, including: generating a transmit magnetic field for transmission into the soil based on a transmit signal; receiving a receive magnetic field; providing a receive signal induced by the receive magnetic field; determining, based on the receive signal, a model of at least two independent components of the receive signal which are due to signals from the soil; processing the receive signal to produce a set of data which is with effects of the signals from the soil reduced therein or removed therefrom by fitting the model to the receive signal, then subtracting the fitted model from the receive signal; and producing, based on the set of data, an indicator output signal for indicating a presence and/or identity of the target.

16 Claims, 3 Drawing Sheets

(56) References Cited

U.S. PATENT DOCUMENTS

2010/0026485 A1    2/2010    Candy
2010/0148960 A1    6/2010    Candy
2012/0212227 A1    8/2012    Candy

FOREIGN PATENT DOCUMENTS

GB    2071327 A    9/1981
WO    2006021045 A1    3/2006
WO    2011011820 A1    2/2011

\* cited by examiner

SIGNAL PROCESSING TECHNIQUE FOR A METAL DETECTOR

CROSS-REFERENCE TO RELATED APPLICATIONS

This application is the United States national phase of International Application No. PCT/AU2014/000466 filed Apr. 24, 2014, and claims priority to Australian Patent Application No. 2013901459 filed Apr. 26, 2013, the disclosures of which are hereby incorporated in their entirety by reference.

INCORPORATION BY REFERENCE

The present application claims priority from Australian Provisional Patent Application No. 2013901459 titled "A Signal Processing Technique for Metal Detector" and filed on 26 Apr. 2013. The content of this application is hereby incorporated by reference in its entirety.

TECHNICAL FIELD

The present invention relates to a signal processing technique for a metal detector.

BACKGROUND

The general forms of most metal detectors are either hand-held battery-operated units, conveyor-mounted units, or vehicle-mounted units. Examples of hand-held products include detectors used to locate gold, explosive land mines or ordnance, coins and treasure. Examples of conveyor-mounted units include fine gold detectors in ore mining operations, and an example of a vehicle-mounted unit includes a unit to locate buried land mines.

These metal detectors usually, but not necessarily, consist of transmit electronics generating a repeating transmit signal cycle of a fundamental period, which is applied to an inductor, for example a transmit coil, which transmits a resulting varying magnetic field, sometimes referred to as a transmit magnetic field.

These metal detectors may also contain receive electronics that processes a receive signal from a measured receive magnetic field, during one or more receive periods during the repeating transmit signal cycle, to produce an indicator output signal, the indicator output signal at least indicating the presence of at least a metal target within the influence of the transmit magnetic field.

During the processing of the receive signal, the receive signal is either sampled, or synchronously demodulated, to produce one or more target channels, the one or more target channels being further processed to produce the indicator output signal.

Time domain metal detectors typically include pulse-induction ("PI") or pulse-induction like metal detectors, and rectangular current-pulse metal detectors, wherein the receive processing includes sampling of the receive signal and/or synchronous demodulation over selected periods, which may include gain weighting of the samples or synchronous demodulation periods.

Frequency domain metal detectors typically include single or multi-frequency transmission, or pulse transmission with either sine-wave weighted synchronous demodulation, or unweighted synchronous demodulation with pre synchronous demodulation band-pass and/or low-pass filtering.

Soils (such as magnetic soils) produce relatively large interfering signals compared to typical signals from sought after targets, for example, gold nuggets or landmines To detect such targets in soils, it is important to ensure that the adverse effects of signals from soils towards the receive signal are removed or minimised.

There are known methods to reduce or remove signals from the soils from a receive signal. For example, U.S. Pat. No. 6,559,645 discloses a method whereby a first signal from the environment is recorded and a second signal, which may contain signal from a metallic object, is compared to the first signal, as a means of enhancing signal to noise ratio by reducing the influence of the first signal from the environment to the second signal. However, the measured first signal from the environment may not be representative of the component of the second signal which results from the environment. This is the case with many soils, which contain multiple components which may vary independently. The amounts of the multiple components can vary substantially over a small area of soil, such that recording the signal from the environment in one instance is representative of the signal from the environment in another instance. This is particularly troublesome in the case of isolated rocks which have different amounts of the multiple components than the host soil in which they are embedded. Such rocks are commonly referred to as "hot rocks".

Advanced methods for reducing or removing signals from soils from a received, signal using synchronous demodulators include those disclosed by Australian Patent Application Nos. 2007304831 and 2009243482.

The invention disclosed herein offers an alternative to the prior art for reducing or removing the effect of signals from soils.

SUMMARY

According to a first aspect of the present invention, there is provided a method for detecting a target in a soil using a metal detector, including: generating a transmit magnetic field for transmission into the soil based on a transmit signal; receiving a receive magnetic field, providing a receive signal induced by the receive magnetic field; determining, based on the receive signal, a model of at least two independent components of the receive signal which are due to signals from the soil; processing the receive signal to produce a set of data which is with effects of the signals from the soil reduced therein or removed therefrom by fitting the model to the receive signal, then subtracting the fitted model from the receive signal; and producing, based on the set of data, an indicator output signal for indicating a presence and/or identity of the target.

In one form, the step of processing the receive signal to produce a set of data which is with effects of the signals from the soil reduced therein or removed therefrom includes: demodulating the receive signal to produce at least three channels; fitting the model to the at least three channels; and subtracting the fitted model from at least one of the at least three channels.

In one form, the step of subtracting the fitted model from the receive signal produces at least two residual signals; and wherein a mathematical function of the at least two residual signals produces the indicator output signal.

In one form, the mathematical function involves at least one linear combination of the residual signals after subtraction of the fitted model from the receive signal.

In one form, one of the at least one linear combination is selected such the combined residual signals are with enhanced sensitivity to metallic objects of a particular type.

In one form, the step of determining the model includes: recording the receive signal over a period of time in a presence of the soil; and selecting periods of the recorded receive signal to derive the model.

In one form, the step of determining the model includes: recording the receive signal at a plurality of locations over the soil to produce a plurality of data; and deriving the model from the plurality of data.

In one form, the model is derived from a recorded receive signal; wherein the recorded receive signal is stored within the metal detector prior to being used to detect the target.

In one form, the model is derived from a recorded receive signal; wherein the model derived from the recorded receive signal is stored within the metal detector prior to being used to detect the target.

In one form, the step of fitting the model involves a decomposition of the recorded receive signal into linearly independent components.

In one form, the step of fitting the model involves a dimensionality reduction of the recorded receive signal whereby the recorded receive signal is represented as containing at least two linearly independent components.

In one form, the dimensionality reduction utilises a singular value decomposition of a function of the recorded receive signal.

In one form, the dimensionality reduction utilises an eigendecomposition of a function of the recorded receive signal.

According to a second aspect of the present invention, there is provided a metal detector capable of performing the method of the first aspect, and its various forms.

According to a third aspect of the present invention, there is provided a computer readable medium including instructions to perform the method of the first aspect, and its various forms.

BRIEF DESCRIPTION OF DRAWINGS

Embodiments of the present invention will be discussed with reference to the accompanying drawings wherein.

DETAILED DESCRIPTION OF THE INVENTION

In this specification, the term "component" is used to refer to a part of a larger whole. When referring to a signal, a component of a signal means a part of a signal, and a superposition of all components of a signal, forms the signal.

Figure 1:
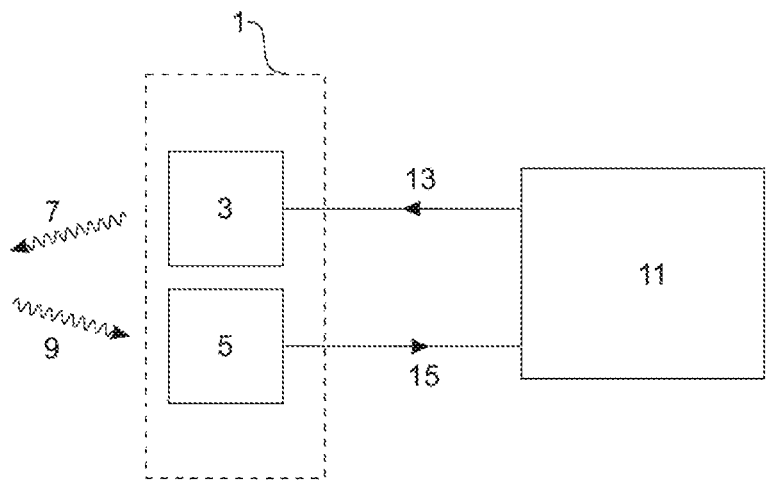
FIG. 1 is a functional block diagram showing the main parts of a metal detector.

FIG. 1 is a functional block diagram showing the main parts of a metal detector. The metal detector includes a sensing head 1, that includes a magnetic field transmitter 3 and a magnetic field receiver 5, to transmit a transmit magnetic field 7 and to receive a receive magnetic field 9, respectively. When the magnetic field transmitter 3 and the magnetic field receiver 5 are separate coils, it is also possible to position them as greatly separated coils, depending upon the application of the metal detector, and not necessarily position them together within the sensing head 1. The magnetic field transmitter 3 and the magnetic field receiver 5 on also be in any form and shape known to, and deemed suitable by, person skilled in the art.

Processing unit 11, which includes transmit and receive electronics, produces a transmit signal 13, in one embodiment, the transmit signal 13 is a repeating transmit signal cycle. The magnetic field transmitter 3, upon receiving the transmit signal 13, generates the transmit magnetic field 7.

The receive signal 15, generated by the receive magnetic field 9 being received by the magnetic field receiver 5, may be amplified and filtered (not shown), then processed by the processing unit 11 to produce an indicator output signal 17 indicating a presence of a target under the influence of the transmit magnetic field 7.

The receive signal 15 normally is a superposition of signals from soil, and signals from one or more targets, if any. Signals from soil may be due to the transient magnetisation of the soil, viscous remanent magnetism of the superparamagnetic components of magnetic soils, or conductive components of saline soils, when the soil is subjected to the transmit magnetic field.

Signals from a target may be due to the eddy currents induced within the target when the target is subjected to the transmit magnetic field.

The transmit signal 13, in order to excite an eddy currents within a target, often includes a transmit magnetic step, where there is a sudden change of magnetic field.

For a transmit magnetic step, a signal from the soil is a decay curve which has a functional form which is usually approximately 1/t. A signal from the target usually has a functional form which is usually approximately $$\exp\left(-\frac{t}{\tau}\right)$$

where $\tau$ is a time constant of the target. Time constant refer to the characteristic response of a target to the transmit magnetic field. A target may have more than one time constant, in which case the signal from the target is a superposition of exponential decays, with different $\tau$ values corresponding to the rime constants in the target.

Signals from soils contaminate signals from targets, thus affecting the ability of a metal detector to detect and/or identify one or more targets. To improve the accuracy of such operations, signals from soils within the receive signal should be reduced or removed.

The approach taken in the present invention to remove the signals from the soil from the receive signal is to fit a model of the soil signal to the receive signal. The receive signal may be substantially only signal from the soil, or it may be substantially only signal from the target, or it may be a superposition of signal from the soil and signal from the target, both signals being of comparable proportions. The fitted model of the signals from the soil is then subtracted from the receive signal. "To fit a model" is an art term. It means, broadly, given a model (mathematical function) of a particular type of signal, to select the values of the adjustable parameters of the model such that the signal predicted by the model closely approximates the measured signal. The model is therefore "fitted" to the measured signal. In this specification, the terms "soil signal" and "signals from soil" are used interchangeably.

With an appropriate choice of a model of the signals from the soil, it was found that the residual, after the subtraction, is substantially insensitive to the components of the signals from the soil. If the components of the signals from the soil were to increase or decrease, the residual will be approximately unchanged.

Figure 2:
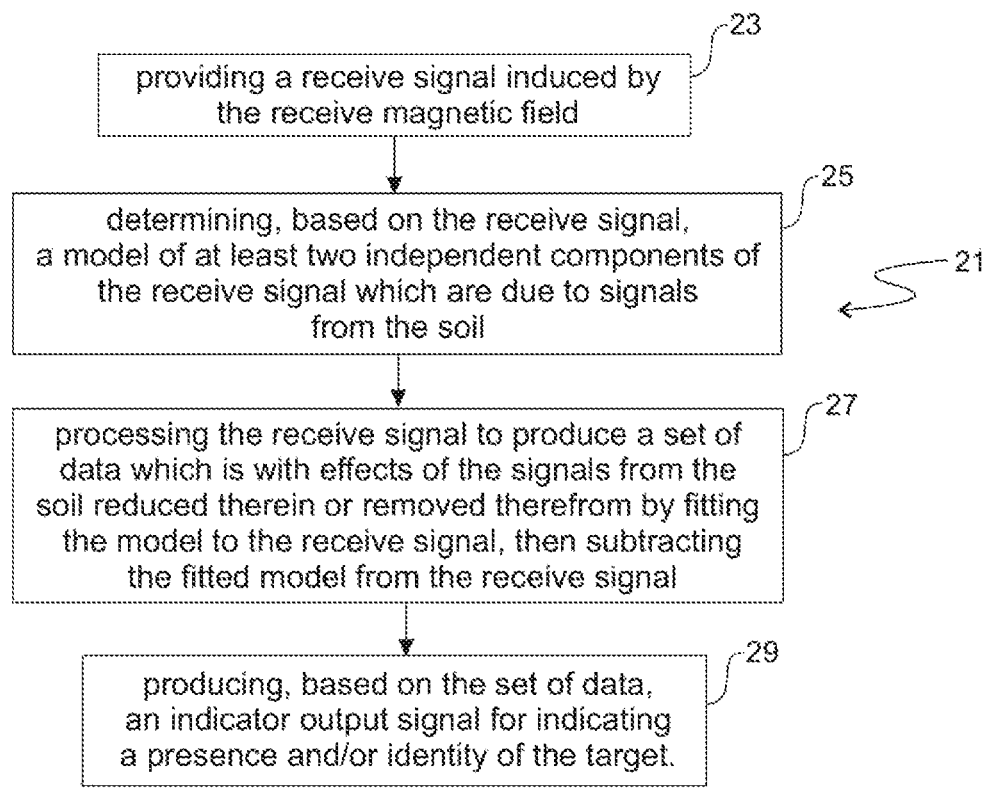
FIG. 2 illustrates the broad concept of the present invention.

FIG. 2 depicts steps 21 in accordance with one broad aspect of the present invention. The first step 23 involves providing a receive signal induced by the receive magnetic field as received by a magnetic field receiver (e.g. a coil). In other words, a receive signal is obtained through a magnetic field receiver. The second step 25 involves determining, based on the receive signal, a model of at least two independent components of the receive signal which are due to signals from the soil. The at least two components may be two components due to, but not limited to, transient magnetisation of the soil, viscous remanent magnetism of the superparamagnetic components of magnetic soils, or conductive components of saline soils. The third step 27 includes processing the receive signal by fitting a model of a component or components of the receive signal which is due to the signals from the soil. In one form, the set of data is synchronously demodulated prior to processing. In another form, the entire receive signal is digitised prior to the processing. The third step 27 also involves subtracting the fitted model from the receive signal. With steps 25 and 27, a set of data which is with effects of signals from the soil reduced therein or removed therefrom is produced. In one form, a function of the fitted model and the receive signal, which is preferably a subtraction of the fitted model from the receive signal, produces an intermediate signal which is substantially free from signals from soil. The intermediate signal may be stored or further processed, in another form, a linear combination of the different elements of the intermediate and the receive signal produces the desired results.

In the fourth step 29, an indicator output signal is produced based on the processed receive signal (the set of data which is with effects of signals from the soil reduced therein or removed therefrom). How the processed receive signal is utilised to produce the indicator output signal is not the focus of this specification and can take a form of many forms deemed appropriate by a skilled addressee. In one embodiment, the indicator output signal indicates the presence and for identity of the target when the target is within an influence of the transmit magnetic field.

As an example to illustrate the invention, suppose a transmit magnetic field is transmitted such that the component SW of the receive signal due to the signals from the soil has a functional form which is given by:

$$S(t) = k_1 \frac{1}{t} + k_2 \frac{\log t}{t} \qquad (1)$$

where the values $k_1$ and $k_2$ may vary independent at different locations over the soil, and are also dependent on the coupling between the Tx and Rx via the soil.

The component T(t) of the receive signal due to signals from the target has a functional form which is given by:

$$T(t) = k_3 \exp\left(-\frac{t}{\tau}\right) \qquad (2)$$

From (1) and (2), the receive signal R(t) is given by:

$$R(t) = S(t) + T(t) \qquad (3)$$

If one models the signal from the soil using a model M(t) given by $$M(t) = k_1 \frac{1}{t} + k_2 \frac{\log t}{t} \qquad (4)$$

then fit this model of the soil to the receive signal. We can express the model at a set of times $t=t_1, t_2, \ldots, t_n$ as a system of equations $$M = Xk$$

where $$X = \begin{bmatrix} \frac{1}{t_1} & \frac{1}{t_2} & \cdots & \frac{1}{t_n} \\ \frac{\log t_1}{t_1} & \frac{\log t_2}{t_2} & \cdots & \frac{\log t_n}{t_n} \end{bmatrix}$$

and $$k = \begin{bmatrix} k_1 \\ k_2 \end{bmatrix}$$

to produce an estimate of the receive signal $\hat{R}$ given by:

$$\hat{R} = X\hat{k} \qquad (5)$$

where $\hat{k}$ is a vector of free parameters, which in this example has two elements $k_1$ and $k_2$. The vector k which gives the best fit of the model to the receive signal in the least squares sense can be calculated.

We can express the soil signal S(t) as a vector S of values at the same times $t=t_1, t_2, \ldots t_n$, and the target signal T(t) as a vector T of values at the same times $t=t_1, t_2, \ldots t_n$, so that the measured receive signal is given as $$R = S + T$$

Then $\hat{k}$ is given by the normal equations:

$$\hat{k} = (M^T M)^{-1} M^T (S+T) \qquad (6)$$

where the superscript T indicates the matrix transpose operation. The estimate of the receive signal $\hat{R}$ is therefore:

$$\hat{R} = M\hat{k} = (M^T M)^{-1} M^T R M \qquad (7)$$

We can then subtract the fitted model of the receive signal from the receive signal as $$\begin{aligned} R - \hat{R} &= S + T - (M^T M)^{-1} M^T (S+T) M \\ &= (S - (M^T M)^{-1} M^T S M) + (T - (M^T M)^{-1} M^T T M) \end{aligned} \qquad (8)$$

If the model M of the soil is equal to the functional form of the components of the receive signal due to the soil S, that is M=S, then the first term in the previous equation is zero, and therefore:

$$R - \hat{R} = (T - (M^T M)^{-1} M^T T M) \qquad (9)$$

So, we see that the residual $R-\hat{R}$ is independent S. That is, it is independent of the components of the receive signal which are due to the signal from the soil. However, it is sensitive to the form of the components of the receive signal due to the target. Therefore we can use the residual signal to indicate the presence and/or the identity of the target Although we give an example of fitting the model of the soil signal to the receive signal using the framework of linear least squares, this should not be seen as limiting. There are many methods in which a model of the soil signal can be fitted to the receive signal. Examples of methods in which a model of the soil signal can be fitted to the receive signal include adaptive filters such as least mean squares filter, recursive least squares filter, and Kalman filter, as well as a host of optimisation techniques such as gradient descent, non-linear least squares, Levenberg-Marquardt, and metaheuristics such as simulated annealing, genetic algorithms, and differential evolution.

In the previous calculations we have represented the signals as vectors of values. In practice, the receive signal can be represented as a vector of values, for instance by sampling the receive signal at various times with each sample representing a value in the vector representation, or by synchronously demodulating the receive signal with multiple time windows to produce multiple channels in the case of a PI or PI-like metal detector, or by synchronous demodulation of the receive signal with multiple frequencies to produce multiple channels in the case of a continuous wave metal detector with each channel representing a value in the vector representation. In the case of a continuous wave metal detector, the receive signals, and correspondingly also the model of the soil signal, are usually expressed as functions of frequency, rather than functions of time. The mathematical framework of the present invention of fitting a model of the soil signal to the received signal and subtracting this fitted model of the soil signal from the received signal as expressed earlier can be used for continuous wave metal detectors more conveniently when the receive signals, and correspondingly also the model of the soil signal, are usually expressed a functions of frequency, rather than functions of time.

Figure 3:
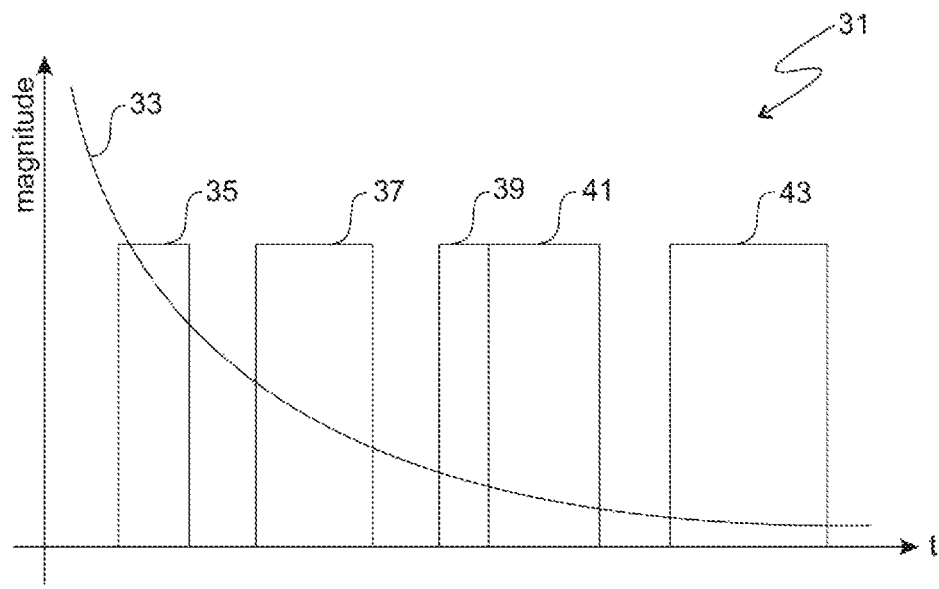
FIG. 3 depicts a production of a vector by sampling a receive signal.

FIG. 3 depicts one example 31 regarding how a vector is formed. In this example 31, receive signal 33 is sampled at time windows 35, 37, 39, 41 and 43. While the number of time windows is five in this example, it is not necessary so. In one form, different from the arrangement shown in FIG. 3, the time windows can have widths which are approximately logarithmically increasing with time.

In one embodiment the residual signal is gain weighted with different gains in different parts of the residual signal to produce multiple channels which are integrated or low-pass filtered, then used as an indicator output which may be used to indicate the presence of a target.

In another embodiment, the residual signal is gain weighted with different gains in different parts of the residual signal to produce multiple channels which are integrated or low-pass filtered, the ratios of these channels being used to indicate the identity of the target.

In another embodiment, the receive signal is demodulated with at least two frequencies to produce at least two channels and a model of the soil signal in each of these at least two channels is fitted to the two channels and then the fitted model is subtracted from each of the two channels wherein the two channels after this subtraction are substantially insensitive to signals from the soil.

Figure 4:
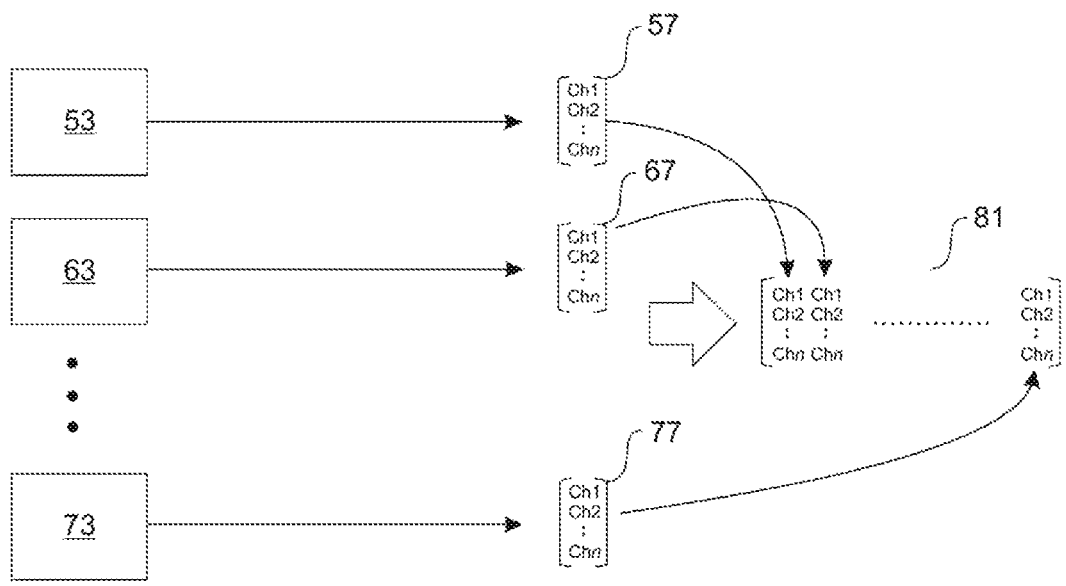
FIGS. 4 and 5 depict a recording of processed received signals and an averaging of many processed receive signals.
Figure 5:
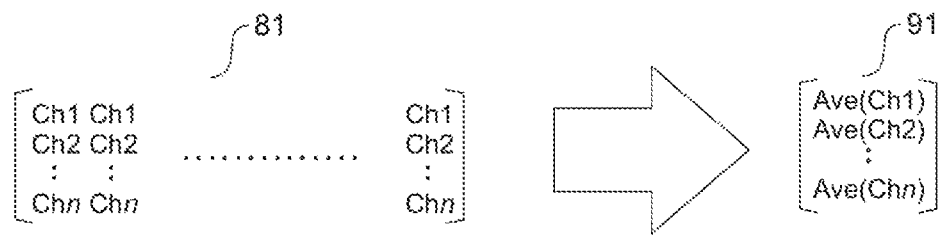

In one embodiment, the model is determined by recording at least two measurements of the receive signal at least two different locations over the soil during which the receive signal includes substantially only the signals from the soil. This may be achieved by recording the receive signal while the search head is in close proximity to the soil and not in close proximity with the target. The recording process may involve averaging many receive signals, as shown in FIGS. 4 and 5. FIG. 4 shows that different receive signals are sampled n times to produce n number of channels (Ch1, Ch2, ..., Chn), or synchronously demodulated with at least a demodulation functions then low pass filtered to produce n channels, shown as 53, 63, and 73, to produce corresponding n vectors 57, 67 and 77. The vectors can be stored as a matrix as shown as 81. In this way, multiple representations of the soil signal can be aggregated in the matrix. From the matrix 81 an average matrix 91 as shown in FIG. 5 can be obtained. At a minimum, only two channels are required to produce two corresponding vectors. Alternatively, rather than averaging the recordings, other methods of dimensionality reduction may be used. For example, from the matrix 81 we could use principal component analysis or a similar low-rank approximation to reduce the dimensionality of the matrix 81. The low-rank approximation could be used in place of the average matrix 91. Alternatively, or in addition, we could change the basis of the matrix 81 by applying a linear transformation. In practice the recordings could be made in a number of ways. The operator of the metal detector may initiate the recording at two different locations over the soil. Alternatively, the metal detector may be recording while the operator is actively using the metal detector to find targets of interest. A process can then be used to select periods of the recorded data, which substantially contain only signals from the soil, to use in the construction of matrix 81.

Using recordings of the receive signal to construct a model of the soil signal offers advantages over known methods for at least two reasons. The form of the response from the soil depends on the transmit magnetic field. Variations in the transmit magnetic field can occur from detector to detector because of component tolerances and component aging, as well as thermal drift in components. Therefore, from detector to detector, and at different temperatures, the form of the soil signal can differ. Measuring the form of the soil signals for each detector therefore offers a more accurate cancellation of the actual soil signal produced by each detector than can a prescribed model of the soil signals. In addition, measuring the soil signal produced by the detector at approximately the time of use of the detector can also offer a more accurate cancellation of the actual soil signal produced by the detector at the time of use. Most modern metal detectors produce a soil sensitive channel with which to tune the soil cancellation by linearly combining it with target sensitive and soil insensitive channel such that the soil signal is reduced or removed. However, the soil sensitive channel is also target sensitive, so the process of linearly combining it with the target sensitive channel may reduce the sensitivity of the target sensitive signal to targets and/or increase the noise present in the target sensitive channel, both of which decrease the maximum depth at which the detector can detect metal targets.

In yet another embodiment, the step of fitting the model involves a decomposition of the recorded receive signal into linearly independent components. It is known the soil signal may contain more than one independent component. For example, Australian Patent Application No. 2007304831 teaches that the soil may have two components, the first component and the second component are proportional to k1 and k2 log(F) respectively at least over the frequency range of 1 kHz to 100 kHz, where k1 and k2 are constants, and k2/k1 is dependent on the materials, F is frequency. Australian Patent Application No. 2009243482 teaches that the soil may also have a component which is approximately a uniform conducting half-space, for example where the soil has a saline component. Soils may also have other components, for instance where the saline component is not approximately a uniform conducting half-space. This may occur, for instance, when the saline component does not extend to great depths below the surface of the soil, or when the saline component changes density as function of depth below the surface. There are also soils which do not fit well to the model taught in Australian Patent Application No. 2007304831.

Figure 6:
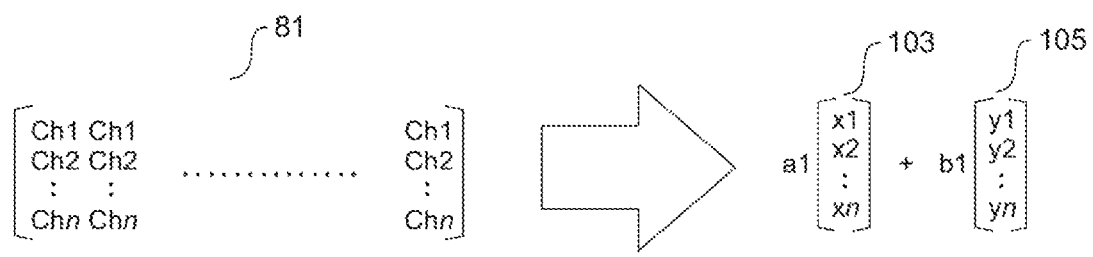
FIG. 6 depicts two singular vectors obtained from a recorded matrix of column vectors to form a model.

Recording the receive signal over some time in an environment where there are multiple independent components allows us to decompose the recorded receive signal into its independent components. That is, we can determine what the independent components are for a particular soil. This decomposition can be performed using a number of different well-known techniques, such as principal component analysis, independent component analysis, singular value decomposition, eigenvalue decomposition (also known as eigendecomposition). We can also choose to ignore some of the independent components which are least significant. For instance, we may choose to model the soil as being a linear combination of only, say, the first three principal components from a principal component analysis, or a linear combination of only the two right singular vectors corresponding to the two highest singular values from a singular value decomposition as shown in FIG. 6. In particular, FIG. 6 depicts two singular vectors 103 and 105 with highest two singular values are obtained from a recorded matric of vectors 81. A model can then be formed using a linear combination of the two singular vectors 103 and 105. The advantage of ignoring some of the independent components is that, in general, most will contain information only about the idiosyncrasies of the noise in the record receive signal, and only few (usually one, two, or three) contain information about the soil.

In another embodiment the step of producing an indicator output involves constructing a linear combination of the residual signals after the fitted model has been subtracted from them. The particular linear combination chosen will determine its sensitivity to different metallic objects. Each of the residuals on their own have a specific sensitivity to different metallic objects. This depends on the distribution of relaxation frequencies of the metallic object. The linear combination chosen may, for example, contain predominantly residuals which are particularly sensitive to metallic objects with high relaxation frequencies. The linear combination will then be particularly sensitive to metallic objects with high relaxation frequencies. Furthermore, each of the residuals will contain some amount of noise resulting from electronic circuitry and unwanted electromagnetic interference received by the receiver. The particular linear combination chosen will therefore also contain some amount of noise, and can be tailored such that the signal to noise ratio is as high as possible. Thus, the particular linear combination chosen will determine the types of metallic objects which that metal detector will favour the detection of.

The following is yet another example illustrating the present invention. Suppose that the receive signal consists of a linear combination of two components. Following a magnetic step applied by a transmit coil to the soil, the voltage across the receive coil, which is not coupled to the transmit coil, is given by:

$$V(t) = k_1 \frac{1}{t} + k_2 \frac{\ln t}{t} + \text{noise}$$

as is taught by AU2011101689, where $k_1$ and $k_2$ may take on different values for different soils, or at different locations on a particular soil which are separated spatially by a small distance, as the soil composition changes spatially. Typically, $k_1 \gg k_2$.

Now, suppose that we demodulate this signal, which could be done, for example by using a gated amplifier, or by performing similar operations on a sampled signal in digital signal processing. Performing the demodulation using analogue circuits reduces the amount of digital signal processing required, but may increase the complexity of the electronic circuits required. We construct n demodulation functions $f_1(t), f_2(t), \ldots, f_n(t)$. Using these n demodulation functions, we demodulate the voltage across the receive coil, and integrate the resulting signal within a time window between $t_1$ and $t_2$ to produce a vector of outputs d given by:

$$d = \begin{bmatrix} d_1 \\ d_2 \\ \vdots \\ d_n \end{bmatrix} = \begin{bmatrix} \int_{t_1}^{t_2} V(t) \cdot f_1(t) \, dt \\ \int_{t_1}^{t_2} V(t) \cdot f_2(t) \, dt \\ \vdots \\ \int_{t_1}^{t_2} V(t) \cdot f_n(t) \, dt \end{bmatrix}$$

So, for each demodulation function, we have a single output.

Now suppose that we repeat this process m times with the coils at different locations over the soil, say, over a region of a few square meters. For the ith measurement we produce a vector of outputs $d_i$. If we stack these vectors as column vectors, we can produce a matrix D of data as $$D = \begin{bmatrix} d_{1,1} & d_{1,2} & \cdots & d_{1,m} \\ d_{2,1} & d_{2,2} & & \\ \vdots & & \ddots & \\ d_{n,1} & & & d_{n,m} \end{bmatrix}$$

We could calculate a low-rank approximation of the matrix D. That is, we could find a matrix $\hat{D} \sim D$ with Rank(D)$\leq r$ where r is the desired rank. The matrix $\hat{D}$ would then have a number of independent columns which is less than or equal to the desired rank r. Put another way, this means that any column of matrix $\hat{D}$ can be constructed as a linear combination of less than or equal to r column vectors of the basis B, where B is a basis of the vector space defined by the columns of $\hat{D}$. That is, we can express a column vector $\hat{d}^i$ of $\hat{D}$ as $$\hat{d}_i = Bc$$

where c is an r×1 vector which defines the linear combination. Essentially, the matrix $\hat{D}$ implies a model of the soil signals with a complexity which is constrained by r. The model of the soil signals is a linear combination of less than or equal to r components defined by the column vectors of the basis B.

So, the aim is to find a basis B of the vector space defined by the columns of low-rank approximation $\hat{D}$. There are many ways in which this can be achieved. A popular method follows the result of the Eckart-Young-Mirsky theorem. We can produce a singular value decomposition (SVD) of D given as, $$D = U\Sigma V^T$$

where U an n×n unitary matrix, $\Sigma$ is an n×m in rectangular diagonal matrix where the diagonal elements of $\Sigma$ appear in descending order along the diagonal of $\Sigma$, and V is an in m×m in unitary matrix.

We then partition U, $\Sigma$, and V as $$U = [\, U_1 \quad U_2 \,],$$

$$\sum = \begin{bmatrix} \Sigma_1 & 0 \\ 0 & \Sigma_2 \end{bmatrix},$$

and $$V = [V_1 V_2],$$

where $U_1$ is an n×r matrix, $\Sigma_1$ it is an r×r matrix, and $V_1$ is an m×r matrix. Then $\hat{D}^* = U_1 \Sigma_1 V_1^T$ is a low-rank approximation of D in the sense that it is the solution to the minimisation problem given by minimize $\|D - \hat{D}\|_F$ subject to Rank$(\hat{D}) \leq r$, where the braces $\| \|_F$ denotes the Frobenius norm. That is, $$\|D - \hat{D}^*\|_F = \min_{Rank(\hat{D}) \leq r} \|D - \hat{D}\|_F$$

Then, the matrix $U_1$ is a basis of $\hat{D}^*$.

Now, for the typical case outlined here, where we have $$d = \begin{bmatrix} d_1 \\ d_2 \\ \vdots \\ d_n \end{bmatrix} = \begin{bmatrix} \int_{t_1}^{t_2} V(t) \cdot f_1(t) dt \\ \int_{t_1}^{t_2} V(t) \cdot f_2(t) dt \\ \vdots \\ \int_{t_1}^{t_2} V(t) \cdot f_n(t) dt \end{bmatrix}$$

and $$V(t) = k_1 \frac{1}{t} + k_2 \frac{\ln t}{t} + \text{noise}$$

with $k_1 \gg k_2$ and negligible noise component, it rank-1 approximation with r=1 is expected to yield the following solution:

$$U_1(r=1) = \frac{u_1}{\sqrt{u_1^T u_1}}$$

with $$u_1 = \begin{bmatrix} \int_{t_1}^{t_2} \frac{1}{t} \cdot f_1(t) dt \\ \int_{t_1}^{t_2} \frac{1}{t} \cdot f_2(T) dt \\ \vdots \\ \int_{t_1}^{t_2} \frac{1}{t} \cdot f_n(t) dt \end{bmatrix}$$

and a rank-2 approximation with r=2 is expected to yield the following solution:

$$U_1(r=2) = \text{orthonormalised} \begin{bmatrix} \int_{t_1}^{t_2} \frac{1}{t} \cdot f_1(t) dt & \int_{t_1}^{t_2} \frac{\ln t}{t} \cdot f_1(t) dt \\ \int_{t_1}^{t_2} \frac{1}{t} \cdot f_2(t) dt & \int_{t_1}^{t_2} \frac{\ln t}{t} \cdot f_2(t) dt \\ \vdots & \vdots \\ \int_{t_1}^{t_2} \frac{1}{t} \cdot f_n(t) dt & \int_{t_1}^{t_2} \frac{\ln t}{t} \cdot f_n(t) dt \end{bmatrix}$$

by which we mean $U_1$ (r=2) is an orthonormal basis which spans the vector space defined by the matrix in square brackets, Higher-rank approximations with r>2 will yield extra columns in $U_1$ which are particular to the idiosyncrasies of the measured noise rather than providing any additional information about the underlying soil signal characteristics, which are described by two basis vectors of the rank-2 approximation. This is because in this example the underlying sod signal has only two independent components with proportions defined by the $k_1$ and $k_2$ values. In essence, this process discovers the dominant independent components of the soil signal in the outputs d.

The soil signal model is given, as it was earlier, as $$d = U_1 c$$

For a rank-r model, c is an r×1 vector.

We shall now describe how ground balanced signals can be produced from the outputs d given the basis $U_1$.

Given an output $d_i$ we can fit the ground model $\hat{d}_i$ determining the best-fit vector $\hat{c}$. There are many different metrics which can be used to evaluate the goodness-of-fit of the model $\hat{d}_i$. A popular metric is the sum of squared residuals. Using this metric we can determine the best-fit vector $\hat{c}_i$ by solving the normal equations as We can then produce an n×1 vector $g_i$ of output residuals as $$\hat{c}_i = (U_1^T U_1)^{-1} U_1^T d_i$$

Each element of $g_i$ is insensitive to the signals from the soil, or with the effects of soil reduced. Any linear or non-linear combination of the elements of $g_i$ can then be used as an indicator output to indicate the presence of a metallic object which is also insensitive to the signals produced by the soil.

To illustrate this process further, we shall present a numerical example. Suppose, as earlier, that the soil response consists of a linear combination of two components. Following a magnetic step applied by a transmit coil to the soil, the voltage across the receive coil is given by:

$$V(t) = k_1 \frac{1}{t} + k_2 \frac{\ln t}{t} + \text{noise}$$

For simplicity, we will ignore the noise term. Suppose that we sample the V(t) at four different instances corresponding to four different locations over the soil. In these instances, suppose that the values of $k_1$ and $k_2$ are given by the values in the table below.

| Instance # | $k_1$ | $k_2$ |
| --- | --- | --- |
| 1 | 20 | 1 |
| 2 | 21 | 2 |
| 3 | 19 | 3 |

-continued

| Instance # | $k_1$ | $k_2$ |
|---|---|---|
| 4 | 20 | 2 |
| 5 | 21 | 1 |

At each instance, we sample V(t) at eight different times at t={1,2,3,4,5,6,7,8} to generate an output vector s for each instance. For instance, the output vector $s_1$ corresponding to the first instance is $$s_1 = \begin{bmatrix} V(1) \\ V(2) \\ V(3) \\ V(4) \\ V(5) \\ V(6) \\ V(7) \\ V(8) \end{bmatrix} = 20 \begin{bmatrix} 1/1 \\ 1/2 \\ 1/3 \\ 1/4 \\ 1/5 \\ 1/6 \\ 1/7 \\ 1/8 \end{bmatrix} + 1 \begin{bmatrix} \ln 1/1 \\ \ln 2/2 \\ \ln 3/3 \\ \ln 4/4 \\ \ln 5/5 \\ \ln 6/6 \\ \ln 7/7 \\ \ln 8/8 \end{bmatrix} = \begin{bmatrix} 20 \\ 10.34657359 \\ 7.03287076 \\ 5.34657359 \\ 4.32188758 \\ 3.63195991 \\ 3.13513002 \\ 2.75993019 \end{bmatrix}$$

We then demodulate this signal by multiplying by, say, four different demodulation functions defined at the sampling times t={1,2,3,4,5,6,7,8} by $$f_1 = \begin{bmatrix} 8 \\ -6 \\ -5 \\ 1 \\ 1 \\ 1 \\ 0 \\ 0 \end{bmatrix},$$

$$f_2 = \begin{bmatrix} 4 \\ 0 \\ -2 \\ -2 \\ -1 \\ 0 \\ 0 \\ 1 \end{bmatrix},$$

$$f_3 = \begin{bmatrix} 4 \\ 2 \\ -2 \\ -2 \\ -2 \\ -2 \\ 1 \\ 1 \end{bmatrix},$$

$$f_4 = \begin{bmatrix} 8 \\ -6 \\ -3 \\ 1 \\ 0 \\ 0 \\ 0 \\ 0 \end{bmatrix}.$$

These demodulation function may produce outputs which are sensitive to the signals from the soil. We then produce an output vector $d_1$ of demodulated signals as $$d_1 = \begin{bmatrix} f_1^T s_1 \\ f_2^T s_1 \\ f_3^T s_1 \\ f_3^T s_1 \end{bmatrix} = \begin{bmatrix} 76.05662573 \\ 53.6791539 \\ 65.9216237 \\ 82.16851976 \end{bmatrix}$$

Applying the same process in the other three instances, and stacking the response vectors as column vectors into a matrix D we have $$D = [d_1 \ d_2 \ d_3 \ d_4 \ d_5] = \begin{bmatrix} 76.05662573 & 77.06325146 & 66.21987718 & 73.11325146 & 80.00662573 \\ 53.6791539 & 54.94997447 & 47.94579504 & 52.19164114 & 56.43748724 \\ 65.9216237 & 67.85396169 & 59.68272824 & 64.48610454 & 69.28948084 \\ 82.16851976 & 83.58703952 & 72.25555928 & 79.33703952 & 86.41851976 \end{bmatrix}$$

A singular value decomposition of D, that is $D=U\Sigma V^T$, is given by $$U = \begin{bmatrix} -0.5382205 & 0.57574075 & 0.57650926 & 0.21558842 \\ -0.38305347 & -0.25000548 & 0.2147558 & -0.86292946 \\ -0.47253064 & -0.74237441 & 0.12933195 & 0.45702108 \\ -0.5833554 & 0.23430768 & -0.77768263 & -0.00247268 \end{bmatrix},$$

-continued $$\Sigma = \begin{bmatrix} 310.087841 & 0 & 0 & 0 & 0 \\ 0 & 1.63188073 & 0 & 0 & 0 \\ 0 & 0 & 0 & 0 & 0 \\ 0 & 0 & 0 & 0 & 0 \end{bmatrix},$$

$$V = \begin{bmatrix} -0.45335753 & 0.41853846 & -0.7451736 & -0.12249271 & 0.22136925 \\ -0.4622878 & -0.09639185 & 0.06773492 & -0.42283524 & -0.770468 \\ -0.40104535 & -0.75871197 & -0.00806218 & -0.22789293 & 0.4599115 \\ -0.4388969 & -0.14552178 & -0.01466018 & 0.86496917 & -0.19443852 \\ -0.47674844 & 0.4676684 & 0.66321065 & -0.07809635 & 0.32870928 \end{bmatrix}$$

which are correct up to rounding errors incurred during the calculation performed with finite-precision arithmetic. We note that only the first two elements on the diagonal of $\Sigma$ are of significant magnitude. The third and fourth elements on the diagonal of $\Sigma$ are zero within rounding errors. This indicates that matrix D is already approximately rank 2.

To form a rank-2 approximation $\hat{D}^* = U_1 \Sigma_1 V_1^T$ of D we partition the matrices U, $\Sigma$, and V as $$U = [U_1 \ U_2],$$

$$\Sigma = \begin{bmatrix} \Sigma_1 & 0 \\ 0 & \Sigma_2 \end{bmatrix},$$

and $$V = [V_1 \ V_2],$$

with $$U_1 = \begin{bmatrix} -0.5382205 & 0.57574075 \\ -0.38305347 & -0.25000548 \\ -0.47253064 & -0.74237441 \\ -0.5833554 & 0.23430768 \end{bmatrix},$$

$$\Sigma_1 = \begin{bmatrix} 310.087841 & 0 \\ 0 & 1.63188073 \end{bmatrix},$$

and $$V_1 = \begin{bmatrix} -0.45335753 & 0.41853846 \\ -0.4622878 & -0.09639185 \\ -0.40104535 & -0.75871197 \\ -0.4388969 & -0.14552178 \\ -0.47674844 & 0.4676684 \end{bmatrix}$$

The matrix $U_1$ is been a basis of $\hat{D}^*$. We therefore have a soil signal model as $$d = U_1 c$$

where c is an 2×1 vector. For each instance $d_i$ we determine a best-fit vector $\hat{c}_i$ as $$\hat{c}_i = (U_1^T U_1)^{-1} U_1^T d_i$$

and produce a vector of residuals $g_i$ as $$g_i = d_i - U_1 c_i$$

For the first instance, we have $$\hat{c}_1 = \begin{bmatrix} -140.58065833 \\ 0.68300485 \end{bmatrix}$$

and so $$g_1 = \begin{bmatrix} 0 \\ 0 \\ 0 \\ 0 \\ 0 \end{bmatrix}$$

which is a zero vector, up to rounding errors, incurred during the calculation performed with finite-precision arithmetic. To create an indicator output to indicate the presence of a metallic object we can construct any linear or non-linear combination of the elements of $g_1$. The method of combining the elements can be the same for all instances. For example, we could output a linear combination $h_i = a^T g_i$ where a is a 4×1 vector defined as $$a = \begin{bmatrix} 0 \\ 1 \\ 2 \\ 0.5 \end{bmatrix}$$

so that we have $$h_1 = 0$$

Similarly, for the second instance we have $$h_2 = 0$$

In fact, we have $$h_1 = h_2 = h_3 = h_4 = 0$$

That is, we have produced an indicator output which is insensitive to the signals from the soil in the case where the soil signal V(t) follows a model $$V(t) = k_1 \frac{1}{t} + k_2 \frac{\ln t}{t}$$

which consists of two independently varying components.

It is important that the data collected in the matrix D is not contaminated by signals from metallic objects. Otherwise, the basis V will also model the signals from those metallic objects.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of as method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory. ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for detecting a target in a soil using a metal detector, comprising:
    a magnetic field transmitter generating a transmit magnetic field for transmission into the soil based on a transmit signal;
    a magnetic field receiver receiving a receive magnetic field;
    providing to a processing unit a receive signal induced by the receive magnetic field;
    the processing unit determining, based on the receive signal, from a plurality of possible models, a model of at least two independent components of the receive signal which are due to signals from the soil, wherein the model provides an estimation of at least three different channels;
    the processing unit processing the receive signal to produce a set of data which is with effects of the signals from the soil reduced therein or removed therefrom by fitting the determined model to the receive signal, then subtracting the fitted model from the receive signal; and
    the processing unit producing, based on the set of data, an indicator output signal for indicating at least one of a presence and an identity of the target;
    wherein the step of processing the receive signal to produce a set of data which is with effects of the signals from the soil reduced therein or removed therefrom includes:
    sampling or demodulating the receive signal to produce the at least three channels;
    fitting the model to the at least three channels; and
    subtracting the fitted model from at least one of the at least three channels.

2. The method of claim 1, wherein the step of subtracting the fitted model from the receive signal produces at least two residual signals; and wherein a mathematical function of the at least two residual signals produces the indicator output signal.

3. The method of claim 2, wherein the mathematical function involves at least one linear combination of the residual signals after subtraction of the fitted model from the receive signal.

4. The method of claim 3, wherein one of the at least one linear combination is selected such that the combined residual signals are with enhanced sensitivity to metallic objects of a particular type.

5. The method of claim 1, wherein the step of determining the model comprises:
    recording the receive signal over a period of time in a presence of the soil; and
    selecting periods of the recorded receive signal from which to derive the model.

6. The method of claim 1, wherein the step of determining the model comprises:
    recording the receive signal at a plurality of locations over the soil to produce a plurality of data; and
    deriving the model from the plurality of data.

7. The method of claim 1, wherein the model is derived from a recorded receive signal; wherein the recorded receive signal is stored within the metal detector prior to being used to detect the target.

8. The method of claim 7, wherein the step of fitting the model involves a decomposition of the recorded receive signal into linearly independent components.

9. The method of claim 7, wherein the step of fitting the model involves a dimensionality reduction of the recorded receive signal whereby the recorded receive signal is represented as containing at least two linearly independent components.

10. The method of claim 9, wherein the dimensionality reduction utilises a singular value decomposition of a function of the recorded receive signal.

11. The method of claim 9, wherein the dimensionality reduction utilises an eigendecomposition of a function of the recorded receive signal.

12. The method of claim 1, wherein the model is derived from a recorded receive signal; wherein the model derived from the recorded receive signal is stored within the metal detector prior to being used to detect the target.

13. The method of claim 12, wherein the step of fitting the model involves a decomposition of the recorded receive signal into linearly independent components.

14. The method of claim 12, wherein the step of fitting the model involves a dimensionality reduction of the recorded receive signal whereby the recorded receive signal is represented as containing at least two linearly independent components.

15. A metal detector configured to perform the method of claim 1.

16. A non-transitory computer readable medium comprising instructions stored therein for causing a computer processor to perform the method of claim 1.

* * * * *